United States Patent
Hong

(10) Patent No.: US 10,609,303 B2
(45) Date of Patent: Mar. 31, 2020

(54) METHOD AND APPARATUS FOR RAPID IMPROVEMENT OF SMOG/LOW-LIGHT-LEVEL IMAGE USING MAPPING TABLE

(71) Applicant: Sung-Hoon Hong, Gwangju (KR)

(72) Inventor: Sung-Hoon Hong, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 18 days.

(21) Appl. No.: 16/114,967

(22) Filed: Aug. 28, 2018

(65) Prior Publication Data

US 2019/0068891 A1    Feb. 28, 2019

(30) Foreign Application Priority Data

Aug. 29, 2017    (KR) .................. 10-2017-0109469

(51) Int. Cl.
    *H04N 5/235*    (2006.01)
    *H04N 5/243*    (2006.01)
    (Continued)

(52) U.S. Cl.
    CPC ............. *H04N 5/243* (2013.01); *G06T 5/009* (2013.01); *H04N 5/217* (2013.01); *H04N 5/2351* (2013.01)

(58) Field of Classification Search
    CPC .... H04N 5/2351; H04N 5/2352; H04N 5/243; H04N 5/217; G06T 5/009; G06T 5/003; G06T 5/002; G06T 5/007

(Continued)

(56) References Cited

U.S. PATENT DOCUMENTS 9,514,373 B2 * 12/2016 Jeromin ............... G06K 9/0085
    315/82
9,667,842 B2 * 5/2017 Baqai .................... H04N 5/217
    348/241
9,846,927 B2 * 12/2017 Zhong .................. G06T 7/0002
    382/104

FOREIGN PATENT DOCUMENTS

| KR | 10-1470831 B1 | 12/2014 |
|---|---|---|
| KR | 10-1535630 B1 | 7/2015 |
| KR | 10-1756173 B1 | 7/2017 |

OTHER PUBLICATIONS

R. Tan, Visibility in bad weather from a single image, in Proc CVPR, pp. 1-8, Alaska, USA Jun. 2008.

(Continued)

*Primary Examiner* — Marly S Camargo
(74) *Attorney, Agent, or Firm* — Reinhart Boerner Van Deuren P.C.

(57) ABSTRACT

Disclosed are a method and apparatus for rapid improvement of a smog/low-light-level image using a mapping table. The method and apparatus provide a clear image by enhancing visibility fast with respect to a smog/low-light-level image, of which visibility is low due to impurities in the air. The apparatus includes: an inversion input unit; a lowest brightness image conversion unit; an atmospheric brightness value calculation unit; a transmission rate LUT calculation unit; a low-pass filter processing unit; a transmission rate allocation unit; a restored-image generation unit; and an inversion output unit. According to the present invention, the method and apparatus for rapid improvement of a smog/low-light-level image using the mapping table enable an embedded processor to operate in real time due to an extremely small amount of computation compared to the conventional technique.

8 Claims, 2 Drawing Sheets

(51) Int. Cl.
*H04N 5/217* (2011.01)
*G06T 5/00* (2006.01)

(58) Field of Classification Search
USPC ... 348/222.1, 217.1, 362, 221.1, 229.1, 234, 348/235, 687; 382/254, 274, 263, 264
See application file for complete search history.

(56) References Cited

OTHER PUBLICATIONS

R. Fattal, Single image dehazing, ACM Trans. Graphics, vol. 27, No. 3, pp. 1-9, Aug. 2008.
K. He, J. Sun, and X. Tang, Single image haze removal using dark channel prior, in Proc. CVPR, pp. 1956-1963, Miami, USA, Jun. 2009.

* cited by examiner

METHOD AND APPARATUS FOR RAPID IMPROVEMENT OF SMOG/LOW-LIGHT-LEVEL IMAGE USING MAPPING TABLE

CROSS REFERENCE TO RELATED APPLICATION

The present application claims priority to Korean Patent Application No. 10-2017-0109469, filed Aug. 29, 2017, the entire contents of which is incorporated herein for all purposes by this reference.

BACKGROUND OF THE INVENTION

Field of the Invention

The present invention relates generally to a method and apparatus for rapid improvement of a smog/low-light-level image using a mapping table. More particularly, the present invention relates to a method and apparatus for rapid improvement of a smog/low-light-level image using a mapping table, the method and apparatus providing a clear image by quickly enhancing visibility with respect to a smog/low-light-level image, of which visibility is low due to impurities in the air.

Description of the Related Art

In an image recorded by a camera, even though the same image is recorded, resolution of the recorded image differs depending on the weather, i.e., weather condition and brightness of illumination. Since an image filmed at night when illumination is low has a lower resolution, an image processing technique has been developed to enhance resolution and to remove noise.

However, in the case of bad weather, for example, fog, Asian dust, smog, snow, hail, rain, resolution of the filmed image is poor due to illumination factors as well as scattering of light caused by the weather condition, etc. An image processing method for enhancing resolution of such image has been developed. However, there has been a fundamental limit to the results of the image processing method, compared to the image filmed in good weather.

Image data is provided in real time by a monitoring camera relating to traffic situation, military situation, crime situation, etc. However, the image data obtained in the weather condition, such as at night, fog, Asian dust, smog, snow, rain has poor resolution, and thus usage is low. The image processing method developed to increase usage of real-time image data may be applied, but an image processing device is heavily loaded due to substantial data required to perform image processing in real time, resulting in a delay in image processing. In order to prevent the delay, an image processing device with high processing capacity is required to be used or a substantial number of image processing devices are required to be used.

For this reason, in real-time image data providing field, real-time image processing has not been widely used.

In the meantime, various methods of estimating a clear image by removing fog in an image containing fog (or smog) have been proposed. Recently, a method of removing fog with respect to a single image has been studied.

In R. Tan, "Visibility in bad weather from a single image", in Proc CVPR, pp. 1-8, Alaska, USA June 2008, a method of removing fog through contrast stretching has been proposed, and in R. Fattal, "Single image dehazing", ACM Trans. Graphics, vol. 27, no. 3, pp. 1-9, August 2008, there has been provided a method of restoring an image with the fog removed by measuring reflectance of the image, on the assumption that the reflectance measured within a particular image region has always the same vector direction.

Also, in K. He, J. Sun, and X. Tang, "Single image haze removal using dark channel prior", in Proc. CVPR, pp. 1956-1963, Miami, USA, June 2009, there has been provided a method of removing fog by using observation result that since a pixel with high color resolution in a clear image without fog has an extremely small value of any one channel among R, G, and B channels, a color image without fog has a pixel having an extremely low channel value in a particular region.

However, these conventional methods require an extremely large amount of computation for transmission rate calculation, and thus real-time processing is difficult on an embedded processor.

In the meantime, Korean Patent No. 10-1470831 has proposed a low-computation method of removing a fog element by obtaining the lower bound of transmission rate and the transmission rate through exponentiation operation. However, in all methods for removing fog, reduction in the amount of computation is required to process a video in a portable device, and the output image is darker than the input image. Thus, a brightness conversion process is required to increase resolution and brightness of the image.

That is, the conventional smog (fog) image improvement method requires an extremely large amount of computation to obtain the transmission rate indicating the rate of which light from a light source reflected in an object is transmitted to the camera, and requires post processing to solve the problem that the brightness of the output image is reduced.

The foregoing is intended merely to aid in the understanding of the background of the present invention, and is not intended to mean that the present invention falls within the purview of the related art that is already known to those skilled in the art.

BRIEF SUMMARY OF THE INVENTION

Accordingly, the present invention has been made keeping in mind the above problems occurring in the related art, and the present invention is intended to provide a clear image by enhancing visibility fast with respect to a smog image, of which visibility is low due to impurities in the air, such as fog, smoke, Asian dust, particulate matter, etc. as well as to a lowest brightness image, such as a night image or a dark indoor image.

Also, the present invention is intended to greatly reduce the amount of computation for transmission rate calculation in such a manner that an embedded processor operates in real time.

In order to achieve the above object, according to one aspect of the present invention, there is provided an apparatus for rapid improvement of a smog/low-light-level image using a mapping table, the apparatus including: an inversion input unit; a lowest brightness image conversion unit; an atmospheric brightness value calculation unit; a transmission rate LUT calculation unit; a low-pass filter processing unit; a transmission rate allocation unit; a restored-image generation unit; an inversion output unit; and a determination unit.

The inversion input unit may receive an input color image signal obtained by an image input device, and may output a selectively inverted color image signal according to a low-light-level determination signal. Also, the lowest brightness image conversion unit may select a brightness value of a darkest channel among color channels in pixels in the selectively inverted color image, and may perform conversion into a lowest brightness image.

The atmospheric brightness value calculation unit may receive the lowest brightness image and the inverted color image signal output from the inversion input unit to obtain a cumulative histogram of the lowest brightness image, and may obtain an atmospheric brightness value for the lowest brightness image. Also, the atmospheric brightness value calculation unit may calculate atmospheric brightness values of respective color channels based on an average value of brightness values for each color channel in pixels of the selectively inverted input image corresponding to image coordinates of pixels of the lowest brightness image.

The transmission rate LUT calculation unit may receive the atmospheric brightness value for the lowest brightness image, may calculate a brightness conversion lookup table (LUT) for visibility enhancement, a brightness conversion lookup table (LUT) for post processing, and a total brightness conversion LUT, and may calculate a transmission rate LUT according to input and output brightness values.

The low-pass filter processing unit may receive the lowest brightness image, and may output a low-pass filtered image. Also, the transmission rate allocation unit may receive the brightness value, which is output from the low-pass filter processing unit, for an image corresponding to image coordinates of a pixel to be restored currently, and may calculate an output transmission rate by applying the brightness value to a mapping table of the transmission rate LUT calculation unit.

The restored-image generation unit may output an output color image, on which visibility enhancement processing and post processing are performed, by receiving the output transmission rate from the transmission rate allocation unit, the selectively inverted input color image signal, and the atmospheric brightness values.

The inversion output unit may output a clear color image signal by selectively inverting the output color image output from the restored-image generation unit according to the low-light-level determination signal. Also, the determination unit may receive image signals from the image input device and the restored-image generation unit, may determine whether the input images are at low light level, and may provide the low-light-level determination signal. Whether the input image is a video may be determined to decide whether to repeat image processing operation.

According to another aspect of the present invention, there is provided a method for rapid improvement of a smog/low-light-level image using a mapping table, the method including: determining whether an input color image received from an image input device is at low light level at step S20; selectively inverting the input color image when the input color image is determined to be at low light level at step S30. That is, when the input image is not at low light level, the color image input at the converting into the lowest brightness image at step S40 is the color image output at step S10. When the input is at low light level, the color image input at the converting into the lowest brightness image at step S40 is that the color image output at step S10 is inverted. Thus, depending on the result of determination at step S20, the selectively inverted color image is input.

The method may include: selecting a brightness value of a darkest channel among color channels in pixels in the selectively inverted image and performing conversion into a lowest brightness image at step S40; and receiving the lowest brightness image and performing low-pass filtering thereon so as to output a low-pass filtered image at step S50.

Also, the method may include: setting a preset top brightness value in a cumulative density function of the lowest brightness image to an atmospheric brightness value of the lowest brightness image, and calculating an average value of brightness values for each color channel in pixels of the selectively inverted image, which corresponds to image coordinates of pixels having a same brightness value as the atmospheric brightness value in the lowest brightness image, as an atmospheric brightness value of each color channel at step S60.

Also, the method may include: constructing a brightness conversion lookup table (LUT) for visibility enhancement, a brightness conversion LUT for post processing, and a total brightness conversion lookup table (LUT) with reference to the atmospheric brightness value of the lowest brightness image, and calculating a transmission rate LUT that indicates a transmission rate according to the brightness value at step S70.

Also, the method may include: generating a restored image by using the transmission rate output by inputting the brightness value of the pixel in the low-pass filtered image to the transmission rate LUT, the brightness value of each color channel and the atmospheric brightness value of each color channel in the selectively inverted image corresponding to coordinates of the pixel in the lowest brightness image input to the transmission rate LUT at step S80.

Also, the method may further include: determining whether the restored image is at low light level at step S90; and inverting the restored image at step S100 when determined to be at low light level at step S90.

As described above, according to the present invention, the method and apparatus for rapid improvement of a smog/low-light-level image enable an embedded processor to operate in real time due to an extremely small amount of computation compared to the conventional technique.

Also, it is possible that visibility is enhanced fast with respect to a smog image, of which visibility is low due to impurities in the air as well as to a lowest brightness image, such as a night image or a dark indoor image.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
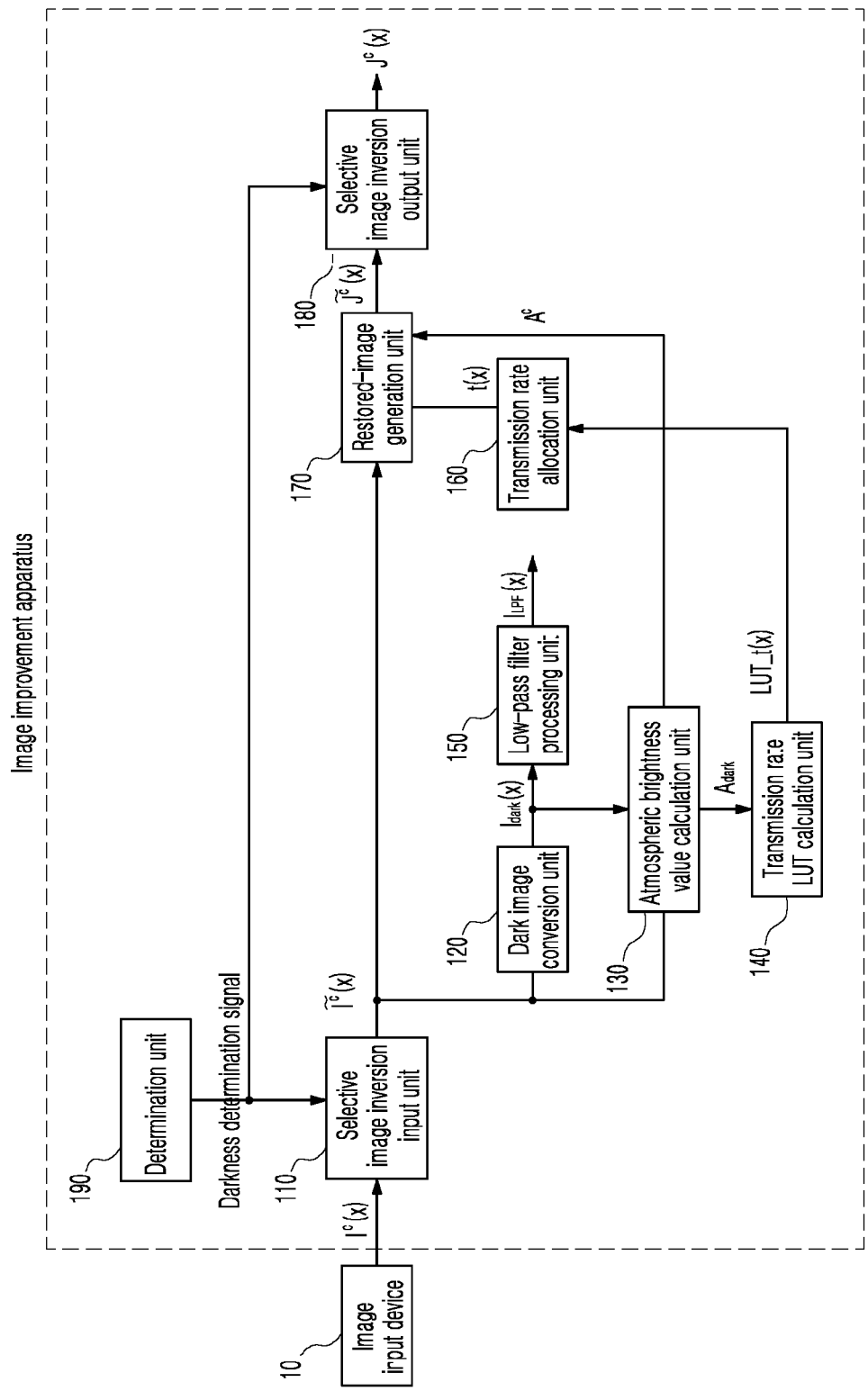
FIG. 1 is a configuration diagram illustrating an apparatus for rapid improvement of a smog/low-light-level image using a mapping table according to an embodiment of the present invention.

Hereinbelow, exemplary embodiments of the present invention will be described in detail with reference to the accompanying drawings such that the invention can be easily embodied by one of ordinary skill in the art to which this invention belongs. However, the present invention may be embodied in various different forms and should not be limited to the embodiments set forth herein. In order to clearly describe the present invention, parts not related to the description are omitted, and similar elements are denoted by similar reference numerals throughout the specification.

It is noted that when a component "includes" an element, unless there is another opposite description thereto, the component does not exclude another element but may further include the other element. Also, the terms "part", "unit", "module", and the like mean a unit for processing at least one function or operation and may be implemented by hardware or software or a combination thereof.

Hereinafter, exemplary embodiments of the present invention will be described in detail with reference to the accompanying drawings.

The same reference numerals in the drawings denote the same members.

The present invention relates to a method and apparatus for rapid improvement of a smog/low-light-level image using a mapping table. More particularly, the present invention relate to a method and apparatus for rapid improvement of a smog/low-light-level image using a mapping table to provide a visibility-enhanced image in real time through the same computation process with respect to an image, of which visibility is low due to impurities in the air, such as fog, smoke, Asian dust, particulate matter, etc., as well as to a lowest brightness image, such as a night image or a dark indoor image.

That is, in order to simultaneously provide visibility enhancement processing and post processing by only using brightness distribution information (histogram) of an input image, the present invention relates to a method of constructing a mapping table for the transmission rate corresponding to brightness information of the input image, of obtaining the transmission rate for each pixel by applying the mapping table to the brightness value of the pixel in the low-pass filtered input image, and of applying the obtained transmission rate to the input image, thereby simultaneously performing visibility enhancement processing and post processing.

Generally, an image obtained by a camera is impaired in visibility by impurities, such as dust, fog, etc. in the atmosphere. The image obtained by the camera may be expressed by the following Equation 1.

$$I(x) = J(x)t(x) + A(1 - t(x)) \quad \text{[Equation 1]}$$

Here, I(x) may be the x-th pixel value of an image obtained by a camera, J(x) may be an original image, and A may be an atmospheric brightness value of the pixel in the image which relates to the farthest position from the camera. Also, t(x) is a transmission rate at the image coordinate x, and exponentially decreases according to the distance as shown in the following Equation 2.

The transmission rate may indicate the rate of which light from a light source reflected in an object is transmitted to the camera.

$$t(x) = e^{-\beta d(x)} \quad \text{[Equation 2]}$$

Here, $\beta$ may be a scattering coefficient of the air, and d(x) may be a distance between the camera and a point in space corresponding to the x-th pixel.

The value of the scattering coefficient $\beta$ is related to the size of particles in the atmosphere. For large particles, such as rain, heavy fog, Asian dust, smoke, etc., $\beta$ is close to one, and when the weather is clear, $\beta$ is close to zero.

Therefore, when the scattering coefficient $\beta$ is constant, the transmission rate t(x) of the distant location, such as the sky, is close to 0, resulting in I(x)≅A in Equation 1. The transmission rate t(x) of the pixel of the very close location is close to one, resulting in I(x)≅J(x).

In order to remove fog, the A and the transmission rate t(x) are obtained from the input image I(x) obtained by the camera, and by using the results, the J(x) in which the fog is removed may be finally restored. From Equation 1, the transmission rate t(x) and the restored value J(x) may be expressed by the following Equation 3 and Equation 4, respectively.

$$t(x) = \frac{I(x) - A}{J(x) - A} \quad \text{[Equation 3]}$$

$$J(x) = \frac{I(x) - A}{t(x)} + A \quad \text{[Equation 4]}$$

In the meantime, the smog-removed image J(x) is required to satisfy 0≤J(x)≤I(x), and thus the range of the transmission rate t(x) in Equation 4 may be determined as the following Equation 5.

$$1 - \frac{I(x)}{A} \le t(x) \le 1 \quad \text{[Equation 5]}$$

In Equation 5, the lower bound of transmission rate $t_{LB}(x)$ may be $t_{LB}(x) = 1 - I(x)/A$, and may mean the transmission rate in the case where an object is invisible due to heavy smog or an object has no radiance originally.

The transmission rate t(x) may exponentially decrease according to the product of the scattering coefficient of the air and the distance from the camera to the object. Therefore, when the atmospheric brightness value A is constant and the transmission rate in a particular weather condition is equal to the lower bound of transmission rate $t_{LB}(x)$, the transmission rate is obtained as the following Equation 6.

$$t(x) = \left[1 - \frac{I(x)}{A}\right]^P = [t_{LB}(x)]^P, 0 \le P \le 1 \quad \text{[Equation 6]}$$

Here, the scattering coefficient in the condition of the lower bound of transmission rate is larger than the scattering coefficient in other weather conditions, and thus the scattering coefficient rate constant P is less than one.

Thus, when the transmission rate is obtained, the restored image J(x) in which the smog is removed according to Equation 4 is obtained.

Generally, the restored image J(x) in which the smog is removed tends to be darker than the input image I(x). Particularly, when the dart portion becomes excessively dark, visibility deteriorates. In order to solve the problem, post processing, i.e., contrast enhancement processing, such as brightness stretching, etc., is required.

In the meantime, when a lowest brightness image with low brightness, such as a night image, is inverted, it has brightness distribution similar to the smog image. Therefore, the inverted night image may also be expressed by the model of Equation 1, and the transmission rate of the inverted night image may also be expressed by Equation 6.

Accordingly, by using the same method as the visibility enhancement method of the smog image according to the present invention, visibility of the image with fog, Asian dust, and smoke as well as of the inverted lowest brightness image may be enhanced.

FIG. 1 is a configuration diagram illustrating an apparatus for rapid improvement of a smog/low-light-level image using a mapping table according to an embodiment of the present invention.

As shown in FIG. 1, the apparatus for rapid improvement of a smog/low-light-level image using the mapping table may include: an inversion input unit 110; a lowest brightness image conversion unit 120; an atmospheric brightness value calculation unit 130; a transmission rate LUT calculation unit 140; a low-pass filter processing unit 150; a transmission rate allocation unit 160; a restored-image generation unit 170; an inversion output unit 180; and a determination unit 190.

The inversion input unit 110 may receive an image signal obtained by an image input device 10, and may output a selectively inverted image signal according to a low-light-level determination signal received from the determination unit 190.

Here, the image input device 10 may be a digital imaging device receiving an image from outside, such as a camera, an image sensor, a high-definition monitoring system, a dash cam, a mobile phone, image equipment for national defence, etc.

According to the embodiment of the present invention, the inversion input unit 110 may receive an input color image signal $I^c(x)$ obtained by the camera, and may output a selectively inverted color image signal $\tilde{I}^c(x)$ according to the low-light-level determination signal of the determination unit 190.

Here, $I^c(x)$ denotes a brightness value of each color channel of a pixel at coordinates x in the input image, and $\tilde{I}^c(x)$ denotes a brightness value of each color channel of a pixel at coordinates x in the selectively inverted input image, with $c \in \{R, G, B\}$.

The lowest brightness image conversion unit 120 may select the brightness value of the darkest channel among the color channels in pixels in the selectively inverted color image, and may perform conversion into a minimum-brightness image (also referred to as a lowest brightness image) $I_{dark}(x)$. That is, the lowest brightness image conversion unit 120 may convert the inverted color image signal $\tilde{I}^c(x)$ into the lowest brightness image $I_{dark}(x)$ by performing computation using the following Equation 7.

$$I_{dark}(x) = \min_{c \in \{R,G,B\}} (\tilde{I}^c(x)) \qquad [\text{Equation 7}]$$

Here, $I_{dark}(x)$, which is obtained by performing computation of Equation 7, may denote a brightness value of a pixel at coordinates x in the lowest brightness image. In the meantime, R denotes red, G denotes green, and B denotes blue.

The atmospheric brightness value calculation unit 130 receives the lowest brightness image $I_{dark}(x)$ and the inverted color image signal $\tilde{I}^c(x)$ output from the inversion input unit 110 to obtain a cumulative histogram $cdf_{dark}(\bullet)$ of the lowest brightness image $I_{dark}(x)$, and may obtain an atmospheric brightness value $A_{dark}$ for the lowest brightness image by performing computation using the following Equation 8.

$$A_{dark} = \min_k [cdf_{dark}(k) \geq hh] \qquad [\text{Equation 8}]$$

Here, $A_{dark}$, which is obtained by performing computation of Equation 8, may denote the atmospheric brightness value of the lowest brightness image $I_{dark}(x)$. Also, the threshold value hh is a value preset by the user, and k is an index indicating the brightness. For example, when the lowest brightness image is an 8-bit image, the range of k is 0 to 255.

Also, the atmospheric brightness value calculation unit 130 may calculate atmospheric brightness values $A^R$, $A^G$, and $A^B$ of respective color channels by performing computation using the following Equation 9 on the basis of an average value of brightness values for each color channel in pixels of the selectively inverted input image corresponding to the image coordinates of pixels of the lowest brightness image.

$$A^c = \text{Average}_{c \in \{R,G,B\}} (\tilde{I}^c(\text{Pos}))$$

$$\text{Pos} = \arg_x (I_{dark}(x) = A_{dark}) \qquad [\text{Equation 9}]$$

Here, $A^C$, which is obtained by performing computation of Equation 9, may denote the atmospheric brightness value of each color channel of $\tilde{I}^c(x)$. Also, Pos is a vector set representing positions of pixels, and may denote positions of pixels having the same brightness value as $A_{dark}$ among pixels of the lowest brightness image $I_{dark}(x)$.

That is, the atmospheric brightness value calculation unit 130 may obtain atmospheric brightness values $A^R$, $A^G$, and $A^B$ of red-green-blue (RGB) color elements for the selectively inverted input image $\tilde{I}^c(x)$ through computation using Equation 9.

The transmission rate LUT calculation unit 140 receives the atmospheric brightness value $A_{dark}$ for the lowest brightness image from the atmospheric brightness value calculation unit 130, and may calculate a brightness conversion lookup table (LUT) for enhancing visibility by performing computation using the following Equation 10.

$$T_{dark}(k) = \frac{k - A_{dark}}{\left(1 - \dfrac{k}{A_{dark}}\right)^P} + A_{dark} \qquad [\text{Equation 10}]$$

Here, $T_{dark}(k)$, which is obtained by performing computation of Equation 10, may be a brightness conversion LUT corresponding to the brightness k for enhancing visibility.

Also, the transmission rate LUT calculation unit 140 may calculate a brightness conversion lookup table (LUT) for post processing by performing computation using the following Equation 11, may calculate a total brightness conversion LUT by performing computation using the following Equation 12, and may calculate a transmission rate LUT (LUT_t) according to input and output brightness values by performing computation using the following Equation 13, finally.

$$T_{post}(j) = \begin{cases} \dfrac{TL_O}{TL_I} X j, & j \leq TL_I \\ \dfrac{TH_O - TL_O}{TH_I - TL_I} X(j - TL_I) + TL_O, & TL_I \leq j \leq TH_I \\ \dfrac{255 - TH_O}{255 - TH_I} X(j - TH_I) + TH_O, & TH_I \leq j \end{cases} \qquad [\text{Equation 11}]$$

Here, $T_{post}(j)$, which is obtained by performing computation of Equation 11, may be a brightness conversion LUT corresponding to the brightness j for post processing. Also, $TL_1$, $TH_1$, $TL_0$, and $TH_0$ are threshold values for brightness conversion as generally having a relation of "$TL_1 \leq TL_0 \leq TH_1 \leq TH_0 \leq 255$". The threshold values may be determined depending on a brightness distribution (histogram) of the lowest brightness image $I_{dark}(x)$.

$$T_{total}(k) = T_{post}(T_{dark}(k)) \qquad [\text{Equation 12}]$$

Here, $T_{total}(k)$ is an output brightness value obtained after performing visibility enhancement processing and post processing for the input brightness k. That is, $T_{total}(k)$, which is obtained by performing computation of Equation 12, may be a total brightness conversion LUT corresponding to the brightness k.

For example, when the input brightness k is an 8-bit signal, the size of the lookup table (LUT) is 256.

$$\text{LUT\_t}(k) = \frac{k - A_{dark}}{T_{total}(k) - A_{dark}} \quad \text{[Equation 13]}$$

Here, LUT_t(k), which is obtained by performing computation of Equation 13, may be a transmission rate LUT corresponding to the brightness k. Also, k may be the input brightness value, $A_{dark}$ may be the atmospheric brightness value of the lowest brightness image obtained from Equation 8, and $T_{total}(k)$ may be the total brightness conversion LUT obtained from Equation 12.

The low-pass filter processing unit 150 may receive the lowest brightness image $I_{dark}(x)$ from the lowest brightness image conversion unit 120, and may output a low-pass filtered image $I_{LPF}(x)$.

The transmission rate allocation unit 160 receives the brightness value $_{IPF}(x)$, which corresponds to the image coordinates x of the pixel to be restored currently, output from the low-pass filter processing unit 150, and may calculate an output transmission rate t(x) by applying the brightness value $I_{LPF}(x)$ to the mapping table of the transmission rate LUT calculation unit 140.

The output transmission rate t(x) may be obtained by performing computation using the following Equation 14.

$$t(x) = \text{LUT\_t}(I_{LPF}(x)) \quad \text{[Equation 14]}$$

Here, $I_{LPF}(x)$ is a brightness value of a pixel at coordinates x in the image which is obtained by performing low-pass filtering on the lowest brightness image, LUT_t(•) is the transmission rate LUT calculated from Equation 13, and t(x) is the transmission rate to be applied to the x-th pixel of the input color image.

The restored-image generation unit 170 receives the output transmission rate t(x) from the transmission rate allocation unit 160, the selectively inverted input color image signal $\tilde{I}^c(x)$, and the atmospheric brightness values $A^R$, $A^G$, and $A^B$, and may output an output color image $\tilde{J}^c(x)$ on which visibility enhancement processing and post processing are performed, by performing computation using the following Equation 15.

$$\tilde{J}^c(x) = \frac{\tilde{I}^c(x) - A^c}{t(x)} + A^c, \, c \in R, G, B \quad \text{[Equation 15]}$$

Here, $\tilde{J}^c(x)$ may denote a brightness value of each color channel of an output pixel obtained by performing definition improvement processing on $\tilde{I}^c(x)$. Also, $\tilde{I}^c(x)$ is the brightness value of the x-th pixel in the selectively inverted input red-green-blue (RGB) color image, $A^c$ is the atmospheric brightness value of each color channel, and t(x) is the transmission rate of the x-th pixel obtained from Equation 14.

That is, the restored-image generation unit 170 receives the selectively inverted input color image signal $\tilde{I}^c(x)$ from the inversion input unit 110, receives the atmospheric brightness values $A^R$, $A^G$, and $A^B$ for the inverted input color image signal $\tilde{I}^c(x)$ from the atmospheric brightness value calculation unit 130, and receives the output transmission rate t(x) from the transmission rate allocation unit 160, whereby the output color image $\tilde{J}^c(x)$ obtained by performing visibility enhancement processing and post processing is output through computation of Equation 15.

In the meantime, the transmission rate allocation unit 160 may provide, to the restored-image generation unit 170, the output transmission rate t(x) obtained by applying the output brightness value $I_{LPF}(x)$ from the low-pass filter processing unit 150, which corresponds to the image coordinates of the pixel $\tilde{I}^c(x)$ input to the restored-image generation unit 170, to the mapping table of the transmission rate LUT calculation unit 140.

The inversion output unit 180 may output a clear color image signal $J^C(x)$ by selectively inverting the output color image $\tilde{J}^c(x)$ output from the restored-image generation unit 170 according to the low-light-level determination signal of the determination unit 190.

Here, $J^C(x)$ may denote the brightness value of each color channel of a pixel at coordinates x in the output image on which definition improvement processing is performed.

The determination unit 190 may receive the image signal, may determine whether the input image is at low light level, and may provide the low-light-level determination signal. Also, the determination unit 190 may determine whether the input image is a video, and may determine whether image processing operation is repeated.

According to the embodiment of the present invention, the determination unit 190 may receive the image signal $I^C(x)$ from the image input device 10 to determine whether the image signal is at low light level, and may transmit the low-light-level determination signal to the inversion input unit 110. Also, the determination unit 190 may receive the output color image $\tilde{J}^c(x)$ from the restored-image generation unit 170 to determine whether the output color image $\tilde{J}^c(x)$ is at low light level, and may transmit the low-light-level determination signal to the inversion output unit 180.

Figure 2:
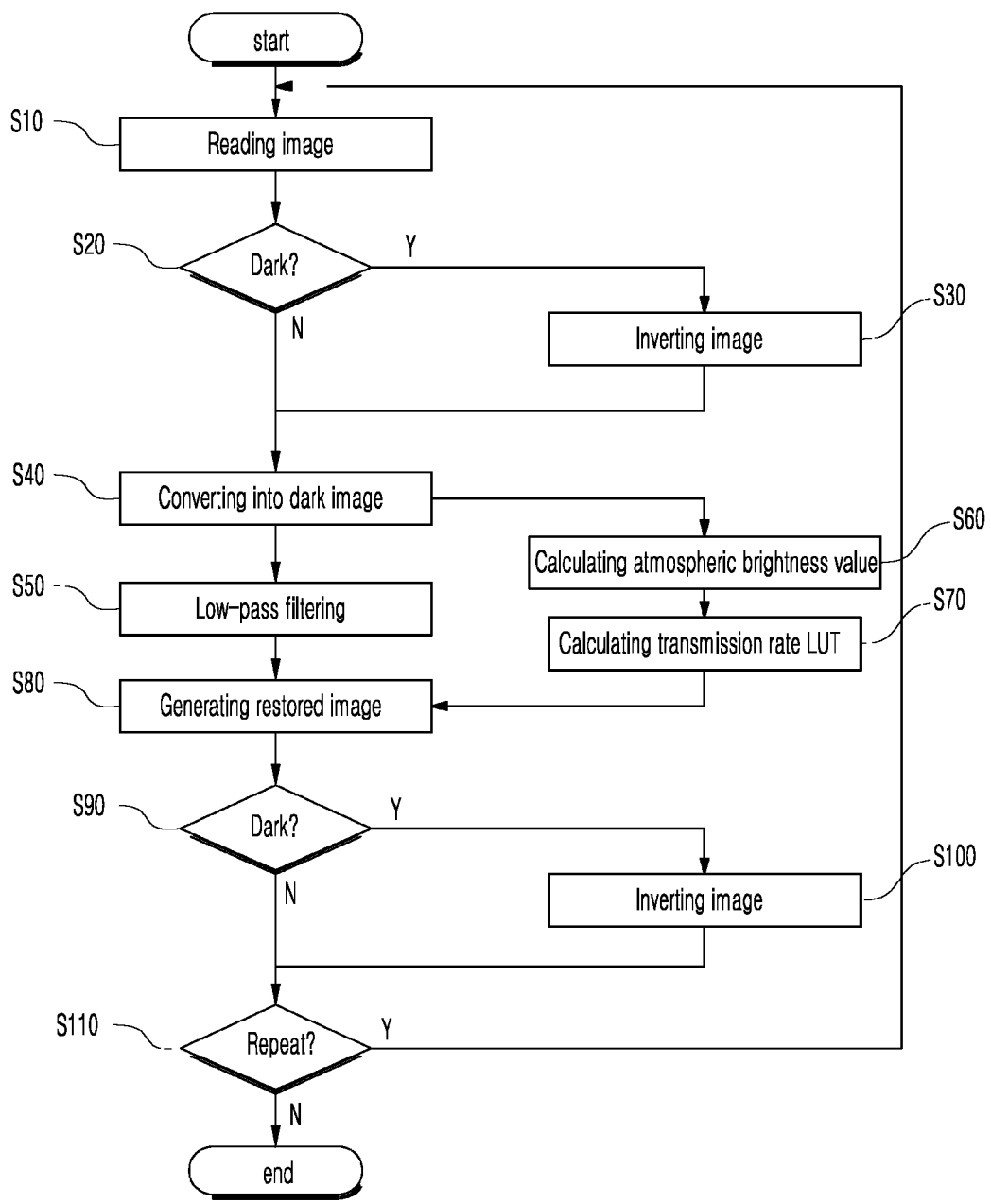
FIG. 2 is a flowchart illustrating a method for rapid improvement of a smog/low-light-level image using a mapping table according to an embodiment of the present invention.

FIG. 2 is a flowchart illustrating a method for rapid improvement of a smog/low-light-level image using a mapping table according to an embodiment of the present invention.

As shown in FIG. 2, according to the embodiment of the present invention, the method for rapid improvement of a smog/low-light-level image using the mapping table may include: reading an image through the image input device 10 at step S10; determining whether the received input image from the image input device 10 is at low light level at step S20; and selectively inverting the input image at step S30 when the result of determination at step S20 is that the received input image is at low light level.

Here, the image input device 10 may be a digital imaging device, such as a camera, image sensor, a high-definition monitoring system, a dash cam, a mobile phone, image equipment for national defence, etc.

At step S10, images of frames obtained by the image input device 10, such as the camera may be stored. When the red-green-blue (RGB) color signal is input, the input signal $I^C(x)$ is a RGB signal, i.e., $C \in \{R.G.B\}$.

Also, at step S30, the inverted image $\tilde{I}^c(x)$ may be expressed by $\tilde{I}^c(x) = 1 - I^C(x)$.

Also, depending on the result of determination at step S20, the input image or the inverted input image may be selectively converted into the lowest brightness image at step S40.

That is, when determined to be at low light level at step S20, the brightness value of the darkest channel among the color channels is selected in pixels in the selectively inverted image at step S30, and conversion into the lowest brightness image is performed at step S40a. Also, when determined not to be at low light level at step S20, the input image received from the image input device 10 is converted into the lowest brightness image at step S40b.

Here, an illuminance sensor or average brightness of an input luminance signal may be used to determine whether it is at low light level, or the user may directly control the determination.

Also, at step S40, the input image or the inverted input image may be converted into the lowest brightness image $I_{dark}(x)$ by performing processing using Equation 7 for each pixel.

Also, the lowest brightness image $I_{dark}(x)$ is received and low-pass filtering is performed thereon such that the low-pass filtered image $I_{LPF}(x)$ may be output at step S50.

Also, the lowest brightness image $I_{dark}(x)$ converted at step S40 may be used to calculate the atmospheric brightness value at step S60.

Calculating of the atmospheric brightness value at step S60 may be obtaining of the atmospheric brightness value corresponding to the farthest position from the camera.

That is, as shown in Equation 7, the brightness value of the darkest channel among the color channel may be selected in pixels in the selectively inverted image, and conversion into the lowest brightness image $I_{dark}(x)$ may be performed.

According to the present invention, in the method of calculating the atmospheric brightness value, a cumulative density function $cdf_{dark}(k)$ with respect to a histogram of the lowest brightness image $I_{dark}(x)$ may be obtained, and as shown in Equation 8, the top hh % brightness value in the cumulative density function may be set to the atmospheric brightness value $A_{dark}$ of the lowest brightness image.

Here, the threshold value hh is a value preset by the user, and k is an index indicating the brightness. For example, when the lowest brightness image is an 8-bit image, the range of k is 0 to 255.

Also, when the input image (or the inverted input image) is the red-green-blue (RGB) signal, in the process of obtaining the atmospheric brightness value AC for each color channel as shown in Equation 9, an average value of brightness values for each color channel in pixels of the input image (or the inverted input image), which corresponds to the same position (image coordinates) as pixels having the same brightness value as $A_{dark}$ among pixels of the lowest brightness image $I_{dark}(x)$, may be calculated as the atmospheric brightness value of each color channel.

Also, with reference to the atmospheric brightness value $A_{dark}$ of the lowest brightness image at step S60, the brightness conversion lookup table (LUT) for visibility enhancement, the brightness conversion LUT for post processing, and the total brightness conversion lookup table (LUT) may be constructed, and the transmission rate according to the brightness value may be output at the calculating of the transmission rate LUT at step S70.

Here, the transmission rate lookup table (LUT) is the mapping table for each pixel of the input image and the transmission rate so as to simultaneously perform both visibility enhancement processing to remove smog/low-light-level elements in the input image, and post processing to enhance visibility of the portion having an extremely low brightness value in the restored image with enhanced visibility.

At the calculating of the transmission rate LUT at step S70, first, the brightness conversion LUT for visibility enhancement may be calculated as shown in Equation 10.

According to an embodiment of the present invention, when the color channel of the input image is expressed in 8 bits, the brightness range of the pixel with respect to the lowest brightness image $I_{dark}(x)$ is 0 to 255. Thus, in Equation 10, the brightness ranges of the input k and of the output $T_{dark}(k)$ is 0 to 255.

Therefore, the first LUT, $T_{dark}(k)$, may define output brightness with enhanced visibility with respect to 256 input brightness k.

Second, the brightness conversion LUT for post processing may be calculated to enhance visibility of the image region having an extremely low brightness value. As post processing, various methods may be applied. According to an embodiment of the present invention, the post processing method using Equation 11 may be used.

Third, the total brightness conversion LUT including visibility enhancement processing and post processing may be calculated as shown in Equation 12.

Last, according to the input and output brightness values in Equation 12, the transmission rate LUT may be calculated as shown in Equation 13.

The transmission rate LUT may be generated by being calculated only once per frame. Therefore, the amount of computation for generating the LUT may be significantly reduced.

Also, the restored image is generated at step S80 by using: the transmission rate t(x) which is output by inputting, to the transmission rate LUT, the brightness value of the pixel with respect to the lowest brightness image on which low-pass filtering is performed at step S50; the brightness value of each color channel in the selectively inverted input color image corresponding to the coordinates of the pixel in the lowest brightness image input to the transmission rate LUT; and the atmospheric brightness value of each color channel.

In definition improvement processing where visibility enhancement processing and post processing are integrated, the LUT generated from Equation 13 is used to allocate the transmission rate to each pixel of the input red-green-blue (RGB) image signal. At the allocating of the transmission rate, when the brightness value of the lowest brightness image on which low-pass filtering is performed is input to the transmission rate LUT as shown in Equation 14, the output transmission rate is allocated as the transmission rate to be applied to the pixel of the corresponding input image.

Low-pass filtering is used because smog or illumination is a low-frequency element having a locally constant value.

At the generating of the restored image at step S80, $\tilde{I}^c(x)$, which is selectively inverted when the input color image is at low light level, is restored into the output color image $\tilde{J}^c(x)$ with improved definition by computation of Equation 15.

Also, whether the restored image generated at step S80 is at low light level may be determined at step S90. When determined to be at low light level at step S90, the restored image is inverted at step S100.

Also, when determined not to be at low light level at step S90, whether the input image is a video is determined and whether there is any image left to be processed is determined such that whether to repeat processing is determined at step S110.

That is, when determined to repeat processing at step S110, processing from step S10 to step S100 is repeated, and otherwise, the process is terminated.

As described above, according to the present invention, the method and apparatus for rapid improvement of a smog/low-light-level image using the mapping table may provide a clear color image signal even in a smog condition as well as a low-light-level condition. Also, due to an extremely small amount of computation compared to the conventional technique, the embedded processor may operate in real time.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for rapid improvement of a smog/low-light-level image using a mapping table, the method comprising:
   determining whether an input color image received from an image input device is at low light level;
   selectively inverting the input color image when the input color image is determined to be at low light level;
   selecting a brightness value of a darkest channel among color channels in pixels in the selectively inverted image and performing conversion into a lowest brightness image;
   converting the input color image into a lowest brightness image when the input color image is determined not to be at low light level;
   receiving the lowest brightness image and performing low-pass filtering thereon so as to output a low-pass filtered image;
   setting a preset top brightness value in a cumulative density function of the lowest brightness image to an atmospheric brightness value of the lowest brightness image, and calculating an average value of brightness values for each color channel in pixels of the selectively inverted image, which corresponds to image coordinates of pixels having a same brightness value as the atmospheric brightness value in the lowest brightness image, as an atmospheric brightness value of each color channel;
   constructing a brightness conversion lookup table (LUT) for visibility enhancement, a brightness conversion LUT for post processing, and a total brightness conversion lookup table (LUT) with reference to the atmospheric brightness value of the lowest brightness image, and calculating a transmission rate LUT that indicates a transmission rate according to the brightness value; and
   generating a restored image by using the transmission rate output by inputting the brightness value of the pixel in the low-pass filtered image to the transmission rate LUT, the brightness value of each color channel and the atmospheric brightness value of each color channel in the selectively inverted image corresponding to coordinates of the pixel in the lowest brightness image input to the transmission rate LUT.

2. The method of claim 1, further comprising:
   determining whether the restored image is at low light level; and
   inverting the restored image when determined to be at low light level.

3. The method of claim 1, wherein the atmospheric brightness value of the lowest brightness image is calculated by performing computation using Equation 8

$$A_{dark} = \min_k [cdf_{dark}(k) \geq hh],$$

wherein $A_{dark}$ is the atmospheric brightness value of the lowest brightness image, $cdf_{dark}(k)$ is a cumulative histogram of the lowest brightness image, hh is a threshold value preset in the cumulative density function of the lowest brightness image, and k is an index indicating brightness.

4. The method of claim 1, wherein the atmospheric brightness value of each color channel is calculated by performing computation using Equation 9

$$A^c = \text{Average}_{c \in \{R,G,B\}}(\vec{I^c}(\text{Pos}))$$

$$\text{Pos} = \arg_x(I_{dark}(x) = A_{dark}),$$

wherein $A^C$ is atmospheric brightness values $A^R$, $A^G$, and $A^B$ of respective color channels, and Pos is a vector set representing positions of pixels with $c \in \{R, G, B\}$.

5. The method of claim 1, wherein the brightness conversion lookup table (LUT) for visibility enhancement is calculated by performing computation using Equation 10

$$T_{dark}(k) = \frac{k - A_{dark}}{\left(1 - \dfrac{k}{A_{dark}}\right)^P} + A_{dark},$$

wherein $T_{dark}(k)$ is the brightness conversion LUT for visibility enhancement corresponding to brightness k, and the total brightness conversion LUT is calculated by performing computation using Equation 12

$$T_{total}(k) = T_{post}(T_{dark}(k)),$$

wherein $T_{total}(k)$ is an output brightness value obtained after performing visibility enhancement processing and post processing for input brightness k.

6. The method of claim 1, wherein the transmission rate LUT that indicates the transmission rate according to the brightness value is calculated (S70) by performing computation using Equation 13

$$\text{LUT\_t}(k) = \frac{k - A_{dark}}{T_{total}(k) - A_{dark}},$$

wherein k is an input brightness value, LUT_t(k) is the transmission rate LUT corresponding to the brightness k, $A_{dark}$ is the atmospheric brightness value of the lowest brightness image, and $T_{total}(k)$ is the total brightness conversion LUT.

7. An apparatus for rapid improvement of a smog/low-light-level image using a mapping table, the apparatus comprising:
   an inversion input unit receiving an input color image signal obtained by an image input device and outputting a selectively inverted color image signal according to a low-light-level determination signal;
   a lowest brightness image conversion unit selecting a brightness value of a darkest channel among color channels in pixels in the selectively inverted color image and performing conversion into a lowest brightness image;

an atmospheric brightness value calculation unit receiving the lowest brightness image and the inverted color image signal output from the inversion input unit to obtain a cumulative histogram of the lowest brightness image, obtaining an atmospheric brightness value for the lowest brightness image, and calculating atmospheric brightness values of respective color channels based on an average value of brightness values for each color channel in pixels of the selectively inverted input image corresponding to image coordinates of pixels of the lowest brightness image;

a transmission rate LUT calculation unit receiving the atmospheric brightness value for the lowest brightness image, calculating a brightness conversion lookup table (LUT) for visibility enhancement, a brightness conversion lookup table (LUT) for post processing, and a total brightness conversion LUT, and calculating a transmission rate LUT according to input and output brightness values;

a low-pass filter processing unit receiving the lowest brightness image and outputting a low-pass filtered image;

a transmission rate allocation unit receiving the brightness value, which is output from the low-pass filter processing unit, for an image corresponding to image coordinates of a pixel to be restored currently, and calculating an output transmission rate by applying the brightness value to a mapping table of the transmission rate LUT calculation unit;

a restored-image generation unit outputting an output color image, on which visibility enhancement processing and post processing are performed, by receiving the output transmission rate from the transmission rate allocation unit, the selectively inverted input color image signal, and the atmospheric brightness values; and an inversion output unit outputting a clear color image signal by selectively inverting the output color image output from the restored-image generation unit according to the low-light-level determination signal.

8. The apparatus of claim 7, further comprising:

a determination unit receiving image signals from the image input device and the restored-image generation unit, determining whether the input images are at low light level, and providing the low-light-level determination signal.

* * * * *